United States Patent [19]

Jocic

[11] Patent Number: 4,824,423
[45] Date of Patent: Apr. 25, 1989

[54] PULLEY WITH HUB CONSTRUCTION OF TWO AXIAL PARTS

[75] Inventor: Radisav Jocic, Unionville, Canada

[73] Assignee: Magna International (Canada) Inc., Concord, Canada

[21] Appl. No.: 111,644

[22] Filed: Oct. 23, 1987

[51] Int. Cl.$^4$ ............................................. F16H 55/49
[52] U.S. Cl. ..................................... 474/170; 474/903
[58] Field of Search .................................. 474/166–170, 474/174, 902, 903; 29/159 R; 72/68; 228/173.4, 174

[56] References Cited

U.S. PATENT DOCUMENTS

| | | | |
|---|---|---|---|
| 4,197,756 | 4/1980 | Yaros | 29/159 R |
| 4,273,547 | 6/1981 | Bytzek | 474/170 |
| 4,551,122 | 11/1985 | Kraft et al. | 474/170 |

Primary Examiner—Thuy M. Bui
Attorney, Agent, or Firm—Cushman, Darby & Cushman

[57] ABSTRACT

A pulley having an axially extending annular belt engaging wall construction including an axial wall portion formed of sheet metal. The sheet metal also forms a circular wall portion integral at one end with the axial wall portion and extending radially inwardly and axially inwardly with respect to the one end of the axial wall portion. The circular wall portion has an annular bend in an intermediate annular area thereof and extends therefrom radially inwardly and axially outwardly to a hub construction. The hub construction is formed of first and second axial parts. The first part is formed integrally from the sheet metal into a cylindrical wall structure extending axially inwardly from the circular wall portion. The second part is made of sheet metal to include a cylindrical wall portion having an annular flange extending therefrom rigidly fixed to the circular wall portion. The cylindrical wall structure and cylindrical wall portion include aligned interior cylindrical shaft engaging surfaces. The axially outward end of the cylindrical wall portion provides an integral radially outwardly extending annular lip suitable to be operatively engaged by a pulling tool for removing the interior cylindrical surface from engagement with a shaft on which it has been engaged.

14 Claims, 2 Drawing Sheets

PULLEY WITH HUB CONSTRUCTION OF TWO AXIAL PARTS

This invention relates to pulleys and more particularly, to pulleys of the type utilized in serpentine belt systems and V-belt systems.

In recent years, the practice of utilizing a plurality of V-belt assemblies in conjunction with the output shaft of an automotive internal combustion engine has been replaced by the utilization of a single serpentine assembly. A typical V-belt assembly included a somewhat rigid V-belt trained about an engine output shaft pulley and a second pulley associated with the accessory to be driven which is fixedly adjustably mounted with respect to the output shaft in order to provide the proper belt tension in operation. In contrast, a serpentine assembly included a plurality of pulleys associated with a plurality of fixed accessories and a relatively thin flexible belt trained about the pulleys so that one or more than one are driven by engagement with the exterior surface of the belt. Proper belt tension in a serpentine assembly is maintained by a belt tensioner having a separate engagement with the belt. Known serpentine systems have utilized flexible belts known as poly-V belts. The pulleys utilized in serpentine assemblies differ from those utilized in V-belt assemblies in the construction of the belt engaging rim or exterior periphery. The belt engaging surfaces of a V-belt pulley are angularly related surfaces disposed in generally opposed relation each being disposed in a plane which is more like a radial plane than an axial plane. In contrast, the belt engaging surfaces of a serpentine belt pulley may be either a planar axial surface, where the pulley engages the exterior serpentine belt surface or a planar axial surface having a plurality of relatively small V-grooves (poly-V) formed therein where the pulley engages the interior serpentine belt surface.

Despite the somewhat more detailed structural requirements of poly-V pulleys as compared with simple V-belt pulleys, both are susceptible to being made from flat sheet stock. An example of a construction procedure which has been successfully utilized to produce poly-V pulleys is disclosed in U.S. Pat. No. 4,273,547.

The pulley illustrated in the patent includes an axially extending annular belt engaging wall construction including an axial wall portion formed of sheet metal. As shown therein, the sheet metal axial wall portion formed the entire belt engaging wall construction. In one embodiment, the exterior surface of the axial wall portion is cylindrical. In another, it is formed in a plurality of small V's. The sheet metal also serves to provide a circular wall portion formed integrally at one end with the axial wall portion and extending radially inwardly to a hub construction. The hub construction is not illustrated in the patent. Instead, the circular wall portion is shown as having an inner circular opening at its interior periphery. In actual practice, the circular wall portion extends radially inwardly and axially inwardly with respect to one end of the axial wall portion, the circular wall portion having an annular bend in an intermediate annular area thereof. This configuration of the circular wall created a degree of resiliency which is highly desirable in operation in controlling stress cracking. The interior periphery of the circular wall was formed with a short axially extending mounting flange forming a part of the hub construction. The remainder of the hub construction included a separate hub member machined of steel into the form of a cylindrical tube having a small exterior flange at one end which abuttingly receives the juncture between the mounting flange and the circular wall and an exterior annular groove at its other end providing a ledge engageable by a pulling too. (See, also, U.S. Pat. No. 4,197,756.) The mounting flange is brazed or otherwise suitably welded to the separate machined hub member. The provision and formation of the separate hub member and the procedures required to fixedly secure the mounting flange to the hub member accounted for approximately 30% of the entire cost of making the pulley. V-belt pulleys made of sheet metal present a similar situation. There exists a need to provide an improved hub construction which will materially reduce the above noted costs without detrimentally affecting the operational characteristics thereof.

It is an object of the present invention to fulfill the above described need. In accordance with the principles of the present invention, this objective is obtained by forming the hub construction of first and second axial parts. The first axial part is formed from the sheet metal which forms the axial wall portion and the circular wall portion of the pulley. The first axial part formed by the sheet metal is a cylindrical wall structure extending axially inwardly from the circular wall portion. The cylindrical wall structure has an interior cylindrical surface for engaging a shaft on which the pulley is to be mounted. The axial extent of the cylindrical wall structure is approximately equal to the radius of the shaft engaging cylindrical surface. The second axial part is formed of sheet metal to include a cylindrical wall portion and an annular flange extending outwardly from one end of the cylindrical wall portion. The annular flange is rigidly secured to the circular wall portion. The cylindrical wall portion extends axially outwardly from the annular flange and has an interior cylindrical shaft engaging surface aligned with the interior cylindrical shaft engaging surface of the cylindrical wall engaging structure. The axially outward end of the cylindrical wall portion provides an integral radially outwardly extending annular lip suitable to be operatively engaged by a pulling tool for removing the interior cylindrical surfaces from engagement with a shaft on which it has been engaged.

Another object of the present invention is the provision of a pulley of the type described which is simple in construction, effective in operation, and economical to manufacture.

These and other objects of the present invention will become more apparent during the course of the following detailed description and appended claims.

The invention may best be understood with reference to the accompanying drawings wherein illustrative embodiments are shown.

IN THE DRAWINGS

Figure 1:
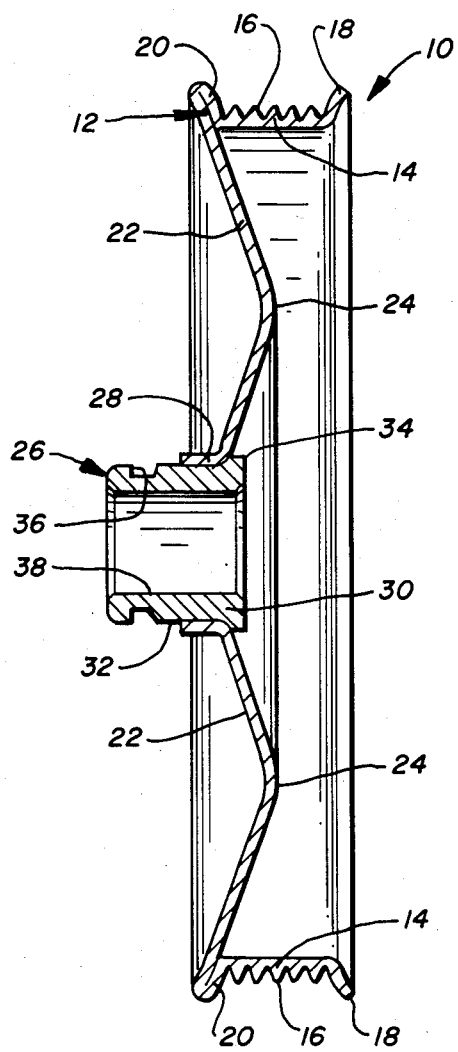
FIG. 1 is a vertical sectional view of a pulley constructed in accordance with prior art practices.

Referring now more particularly to FIG. 1 of the drawings, there is shown therein a pulley, generally indicated at 10, which is constructed in accordance with the prior art practices. As shown, the pulley 10 includes an axially extending annular belt engaging wall construction, generally indicated at 12, which is formed in accordance with the procedures disclosed in U.S. Pat. No. 4,273,547, the disclosure of which is hereby incorporated by reference into the present specification. Briefly, it will be noted that in accordance with the principles enunciated in the aforesaid patent, the entire belt engaging wall construction 12 is formed from a sheet metal blank to include an axially extending wall portion 14 having its exterior peripheral surface formed with a plurality of small V's forming a conventional poly-V configuration 16. The lateral free end of the axial wall portion 14 is formed with a flange 18 and the opposite end is provided with a flange 20 which is integrally connected with a circular wall portion 20. As shown, the outer periphery of the circular wall portion 22 is integrally connected to the outer end of the flange 20 and extends radially inwardly and axially inwardly therefrom. An annular bend 24 is formed in a central annular area of the circular wall portion and the latter extends radially inwardly and axially outwardly from the annular bend and terminates in a hub construction, generally indicated at 26. The hub construction 26 includes an integral axially outwardly extending annular flange 28 formed on the inner periphery of the circular wall portion 22 which connected with a hub member 30. The hub member 30 is preferably machined of steel to include a cylindrical exterior periphery 32 having a radially outwardly extending flange 34 at one end and an annular groove 34 spaced inwardly from the opposite end thereof. The hub member 30 also includes an inner peripheral cylindrical surface 38 which is adapted to engage a shaft on which the pulley 10 is to be mounted. The axial flange 28 of the circular wall portion 22 engages the exterior peripheral surface 32 in abutting relation with the flange 34 and is rigidly secured in such position, as by brazing or welding. The usual procedure is a brazing procedure. It will be understood that the groove 36 provides an annular lip or ledge for receiving a pulling tool which enables the interior cylindrical surface 38 of the hub member 30 to be removed from engagement with the shaft on which it has been engaged. In accordance with the teachings contained in the aforesaid patent, the axial wall portion may have a smooth exterior peripheral surface in lieu of the poly-V construction 16 where the pulley is used to engage the exterior surface of a poly-V belt of a serpentine belt system.

Figure 2:
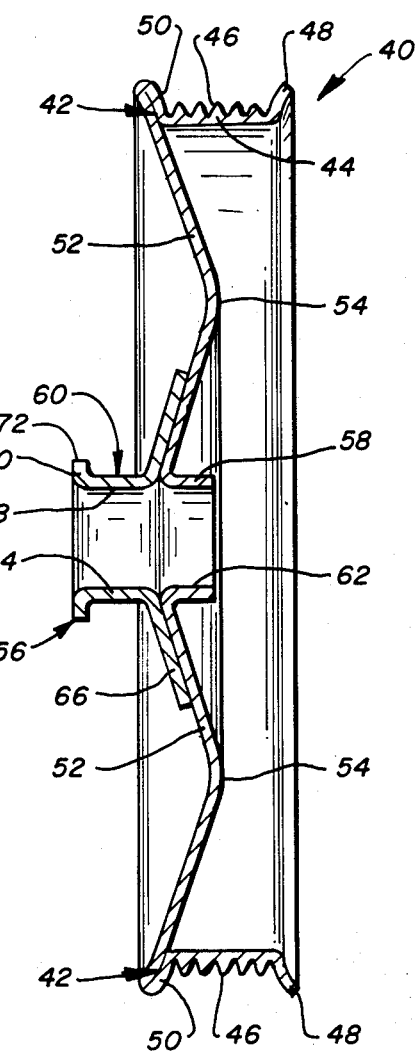
FIG. 2 is a view similar to FIG. 1 illustrating a pulley embodying the principles of the present invention.
Figure 3:
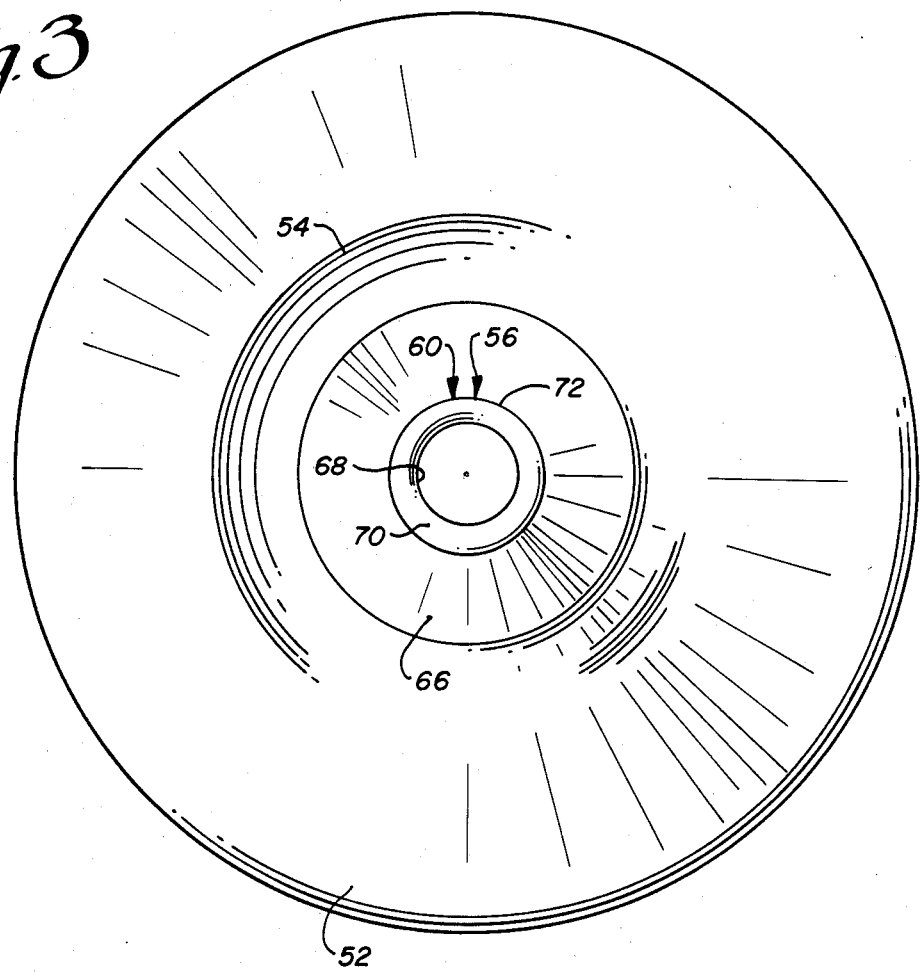
FIG. 3 is a lefthand side elevational view of the pulley shown in FIG. 2.

Referring now more particularly to FIG. 2 of the drawings, there is shown therein a pulley, generally indicated at 40 which embodies the principles of the present invention. Like the pulley 10, the pulley 40 of the present invention includes an axially extending annular belt engaging wall construction, generally indicated at 42, which, as shown, is formed in the same manner as the wall construction 12 of the pulley 10. Thus, the wall construction 42 includes an annular axially extending portion 44 having a poly-V configuration 46 formed in its exterior periphery, with a flange 48 at its laterally outward free end and a flange 50 at its opposite end. The pulley 40 also includes a circular wall portion 52 which is formed integrally at its outer periphery with the outer periphery of the flange 50 of the belt engaging wall construction 42. The circular wall portion 52 extends from its outer periphery radially inwardly and axially inwardly to a annular bend 54 in the central annular area thereof. From the bend 54, the annular wall portion extends radially inwardly and axially outwardly to a hub construction, generally indicated at 56, embodying the principles of the present invention.

In accordance with the principles of the present invention, the hub construction 56 is formed of first and second axial parts 58 and 60. The first part 58 is formed integrally from the sheet metal forming the axially extending wall portion 44 and the circular wall portion 52. Preferably, the integral first hub part is formed on a multi-stage press from metal contained in the central portion of the original sheet metal blank. As shown, the integral first hub part 58 is in the form of a cylindrical wall structure having an interior cylindrical shaft engaging surface 62. The integral cylindrical structure 58 constituting the first hub part has an axial extent approximately equal to the radius of the shaft engaging cylindrical surface 62. The second axial part 60 is formed of sheet metal to include a cylindrical wall portion 64 having an annular flange 66 extending outwardly from one end thereof. The annular flange 66 extends radially outwardly and axially inwardly from the cylindrical wall portion 64 so as to lie in abutting surface to surface engagement with the inner section of the circular wall portion 52 of the pulley 40. The annular flange 66 is rigidly secured in abutting engagement to the inner section of the circular wall portion 52 as by welding or the like. The cylindrical wall portion 64 includes an interior cylindrical shaft engaging surface 68 which is aligned with the interior cylindrical shaft engaging surface 62 of the cylindrical wall structure 58. The axial extent of the cylindrical wall portion 64 is slightly greater than the radius of cylindrical surface 68 so that the entire hub construction provided by the two axial parts 58 and 60 is greater than the common diameter of the cylindrical surfaces 62 and 68. The axially outward free end of the cylindrical wall portion 64 provides an integral radially outwardly extending annular lip construction 70, suitable to be operatively engaged by a pulling tool for removing the interior cylindrical surfaces 62 and 68 from engagement with a shaft on which they have been engaged. As shown, the annular lip construction 70 is in the form of a radially outwardly extended integral annular lip which terminates in a radially outwardly facing annular edge 72.

Figure 4:
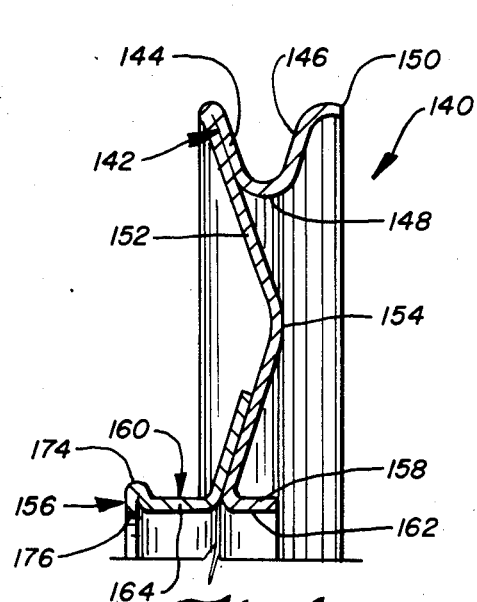
FIG. 4 is a half sectional view of a pulley of modified form embodying the principles of the present invention.

The principles of the present invention, while particularly suited to the making of poly-V pulleys, has applicability also to V-belt type pulleys as well. FIG. 4 illustrates a pulley 140 which exemplifies a modification of this type and, in addition, a modified annular lip configuration within the contemplation of the present invention. As shown, the pulley 140 provides in place of the poly-V belt engaging wall construction 12, a single V-belt engaging wall construction 142. The wall construction 142 includes a pair of radially outwardly diverging inclined wall portions 144 and 146 integrally interconnected at their inner ends as indicated at 148 to form a V-shaped configuration in cross-section. A small axially extending strengthening flange 150 is formed on the outer free end of the inclined wall portion 146. A circular wall portion 152 having an annular bend 154 is integrally connected to the end of the inclined wall portion 144 in a manner similar to the connection of the circular wall portion 52 with flange portion 50. The circular wall portion 152 terminates radially inwardly a hub construction 156 which is similar to the hub structure 56, the components of which are designated by similar reference numerals but with a preceding numeral 1, except for the lip construction. Instead of simple lip 62, the hub construction 156 includes a modified annular lip construction 174. As shown in FIG. 4, the annular lip construction 174 is formed by deforming a marginal end portion of the cylindrical wall structure 164 radially outwardly and then radially inwardly so as to terminate in a radially inwardly facing annular edge 176. As shown, the radially inwardly facing annular edge 176 extends radially inwardly no greater than the cylindrical surface 168 and actually has a diameter which is slightly larger than the diameter of the shaft engaging cylindrical surface 168.

Figure 5:
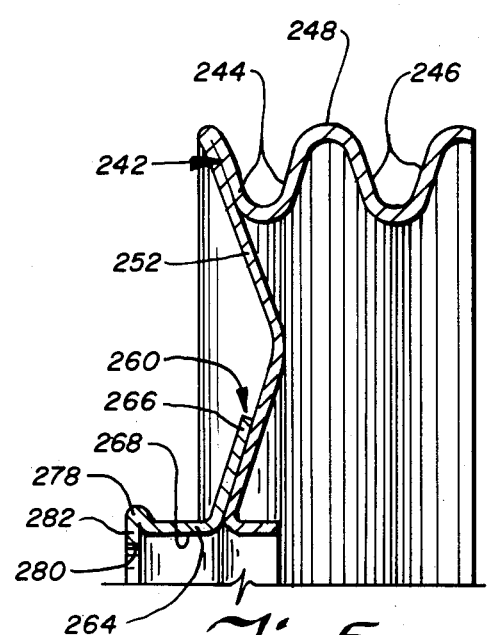
FIG. 5 is a view similar to FIG. 4 showing another modified form of pulley embodying the principles of the present invention.

FIG. 5 illustrates a pulley 240 illustrating a modified V-belt wall construction to which the invention is applicable and having a further modified annular lip configuration embodying the principles of the present invention. FIG. 5 illustrates a pulley 240 which exemplifies a modification of this type and, in addition, another modified annular lip configuration within the contemplation of the present invention. As shown, the pulley 240 provides in place of the poly-V belt engaging wall construction 42 or the single V-belt engaging wall construction 142, a plural V-belt engaging wall construction 242. The wall construction 242 includes two side-by-side pairs of integrally interconnected radially outwardly diverging inclined wall portions 244 and 246. The adjacent free ends of the inner inclined wall portions 244 and 246 are integrally interconnected, as indicated at 248 to form side-by-side pairs of walls of V-shaped configuration in cross-section. A small axially extending strengthening flange 250 is formed on the other outer free end of the other inclined wall portion 246. A circular wall portion 252 having an annular bend 254 is integrally connected to the other end of the other inclined wall portion 244 in a manner similar to the connection of the circular wall portion 52 with flange portion 50. The circular wall portion 252 terminates radially inwardly in a hub construction 256 whch is similar to the hub structure 56, the components of which are designated by similar reference numerals but with a preceding numeral 2, except for the lip construction. Instead of a simple lip 62, the hub construction 256 includes a modified annular lip construction 278. As shown in FIG. 5, the annular lip construction 278 is formed by deforming a marginal end portion of the cylindrical wall structure 264 radially outwardly and then radially inwardly so as to terminate in a radially inwardly facing annular edge 280. In this case, the radially inwardly facing annular edge 280 extends radially inwardly of the cylindrical shaft engaging surface 268 so that the terminal end defines a terminal edge 282 constituting a stop for engaging the end surface of a shaft engaged with the cylindrical surfaces 268 and 262.

It will be understood that the modified lip constructions 174 and 278 have applicability in pulleys of the poly-V type as well as either V-belt type. Similarly, the lip construction 62 has applicability in either V-belt type pulley as well as poly-V pulleys.

It thus will be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. In a pulley having an axially extending annular belt engaging wall construction including an axial wall portion formed of sheet metal, said sheet metal also forming a circular wall portion formed integrally at one end with said axial wall portion and extending radially inwardly and axially inwardly with respect to the one end of said axial wall portion, said circular wall portion having an annular bend in an intermediate annular area thereof and extending therefrom to a hub construction, the improvement which comprises
   said hub construction being formed of first and second axial parts, the first axial part being formed integrally from the sheet metal forming said axial wall portion and said circular wall portion and extending axially inwardly from said circular wall portion in a cylindrical wall structure having an interior cylindrical shaft engaging surface,
   said second axial part being formed of sheet metal to include a cylindrical wall portion and an annular flange extending outwardly from one end of said cylindrical wall portion,
   said annular flange being rigidly secured to said circular wall portion,
   said cylindrical wall portion extending axially outwardly from said annular flange and having an interior cylindrical shaft engaging surface aligned with the interior cylindrical shaft engaging surface of said cylindrical wall structure,
   the axially outward end of said cylindrical wall portion providing an integral radially outwardly extending annular lip suitable to be operatively engaged by a pulling tool for removing said interior cylindrical surfaces from engagement with a shaft on which they have been engaged.

2. The improvement as defined in claim 1 wherein said circular wall portion includes an inner section extending radially inwardly and axially outwardly from the annular bend thereof, said annular flange extending radially outwardly and axially inwardly from said cylindrical wall portion so as to lie in abutting surface to surface engagement with the inner section of said circular wall portion.

3. The improvement as defined in claim 2 wherein said annular flange is rigidly secured in abutting relation to the inner section of said circular wall portion by welding.

4. The improvement as defined in claim 3 wherein said cylindrical wall structure has an axial extent approximately equal to the radius of the interior cylindrical surface thereof, the axial extent of said cylindrical wall portion being slightly greater than the radius of the interior cylindrical surface thereof.

5. The improvement as defined in claim 3 wherein said annular lip is formed by deforming a marginal end portion of the cylindrical wall structure radially outwardly so as to terminate in a radially outwardly facing terminal edge.

6. The improvement as defined in claim 3 wherein said annular lip is formed by deforming a marginal end portion of the cylindrical wall structure radially outwardly and then radially inwardly so as to terminate in a radially inwardly facing terminal edge.

7. The improvement as defined in claim 6 wherein said radially inwardly facing terminal edge is disposed radially inwardly of said cylindrical surface so that the marginal end portion defining the terminal edge constitutes a stop for engaging the end surface of a shaft engaged with said cylindrical surface.

8. The improvement as defined in claim 6 wherein said radially inwardly facing terminal edge extends radially inwardly no greater than said cylindrical surface.

9. The improvement as defined in claim 1 wherein said annular lip is formed by deforming a marginal end portion of the cylindrical wall structure radially outwardly so as to terminate in a radially outwardly facing terminal edge.

10. The improvement as defined in claim 1 wherein said annular lip is formed by deforming a marginal end portion of the cylindrical wall structure radially outwardly and then radially inwardly so as to terminate in a radially inwardly facing terminal edge.

11. The improvement as defined in claim 10 wherein said radially inwardly facing terminal edge is disposed radially inwardly of said cylindrical surface so that the marginal end portion defining the terminal edge constitutes a stop for engaging the end surface of a shaft engaged with said cylindrical surface.

12. The improvement as defined in claim 10 wherein said radially inwardly facing terminal edge extends radially inwardly no greater than said cylindrical surface.

13. The improvement as defined in claim 1 wherein said axial wall portion is in the form of a cylindrical wall portion having a plurality of small side-by-side V-grooves in its exterior periphery and outwardly extending flanges at opposite axial ends thereof.

14. The improvement as defined in claim 1 wherein said axial wall portion is in the form of a pair of radially outwardly diverging wall portions integrally interconnected at their radially inner ends in a V-shaped configuration.

* * * * *